May 2, 1967 W. RANK 3,317,679

VIDEO TRANSDUCING APPARATUS WITH TAPE TENSIONING LEVER

Filed April 8, 1963

Jnventor:

Wolfgang Rank

United States Patent Office 3,317,679

Patented May 2, 1967

3,317,679

VIDEO TRANSDUCING APPARATUS WITH TAPE TENSIONING LEVER

Wolfgang Rank, Kronach, Upper Franconia, Germany, assignor to Loewe Opta Aktiengesellschaft, Berlin, Germany, a company of Germany Filed Apr. 8, 1963, Ser. No. 271,850
Claims priority, application Germany, Apr. 11, 1962, L 41,721
4 Claims. (Cl. 179—100.2)

This invention relates to an apparatus for magnetic recording and reproduction of television signals, of the type in which a magnetic tape is led in a helical loop round a cylinder, in which coaxially to the cylinder axis a disc bearing one or several magnetic heads rotates, the tape runs from a feed spool and is led by means of a driving device with unvarying speed past diverting and guiding means, past one or several fixed magnetic erasing, sound and synchronizing heads, past the rotating magnetic heads and further diverting means and is wound up on a second spool.

Such devices are known which allow, for purposes of monitoring or for quickly finding definite image locations, image signal reproduction during fast winding, i.e. with rapid motion of the tape and when the tape is at a standstill. If, however, the tape remains still for a lengthy period, heavy wear occurs on the tape in the region of the magnetic head and also on the adjacent guiding surface of the magnetic head. For this reason it is usual to raise the tape slightly by hand from the magnetic heads rotating in the cylinder when the tape feed is stopped.

Stopping the rotating magnetic head when the tape is stopped is not possible in practice because it would take too long for the head disc to come to a rest, and later, on re-starting, to run up to the set operating speed.

The present invention has the object of automatically raising the recording tape on stopping the tape drive, so that the above disadvantages can with certainty be eliminated.

In accordance with the invention there is an apparatus for magnetic recording and reproduction of television signals which comprises a cylinder, means for driving and guiding said tape to, around and away from said cylinder, a rotatable disc coaxially mounted within said cylinder, a transducer unit connected with the periphery of said disc, and a tensioning lever for guiding said tape away from said cylinder and for automatically tautening and releasing said tape; said tensioning lever being coordinated with a time-delay member releasing said tension of said tape only when tape and driving means are at a complete standstill.

One embodiment of the invention is explained in detail with the aid of the accompanying drawing in which.

Figure 1:
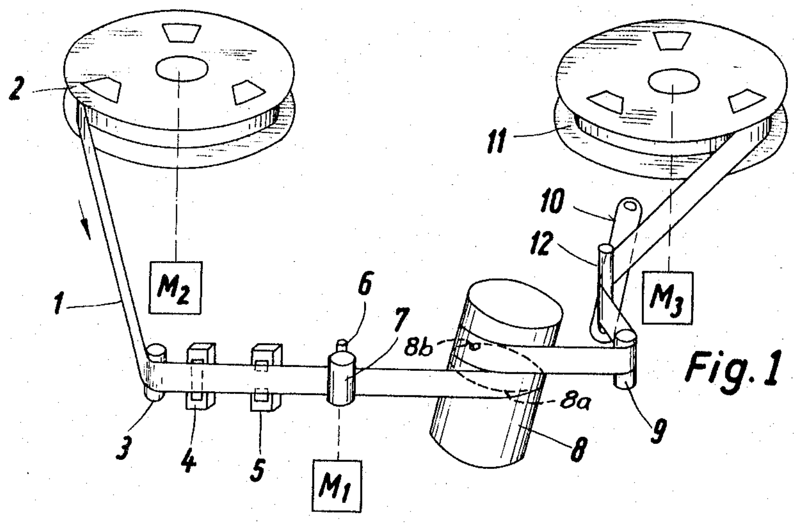
FIG. 1 shows a general view of the embodiment according to the invention.

In FIG. 1 a video magnetic tape is designated 1. It runs from a spool 2 in the direction of the arrow and is led past a guide and diverting roller 3, a fixed magnetic erasing head 4 and a magnetic head or heads 5 for recording a sound signal and/or synchronizing signal in one or both fringe areas of the magnetic tape. The magnetic tape then runs between a capstan 6, which directly or indirectly is driven by a tape driving motor M1, and a pressure roller 7 which can be pressed against the capstan, thus receiving a uniform speed with which it is passed in a helical loop round an obliquely positioned cylinder 8. Inside the cylinder there rotates coaxially to the cylinder axis a head disc 8$a$ with one or several magnetic heads

8$b$, which record the television picture signals in magnetic tracks lying obliquely to the direction of tape run. The head wheel and the magnetic tracks are omitted from the drawing to leave a clear view.

The magnetic tape running from the cylinder passes over a further diverting roller 9 into the range of the tension lever 10 described in detail below and is wound up on a second spool 11, which is driven by a tape tensioning motor M3. A further tape tensioning motor M2 connected to spool 2 brakes spool 2 against the direction of tape run indicated, e.g. by way of a friction clutch or direct with reduced motor current, in order that on the feed side adequate tape tension be created.

Figure 2:
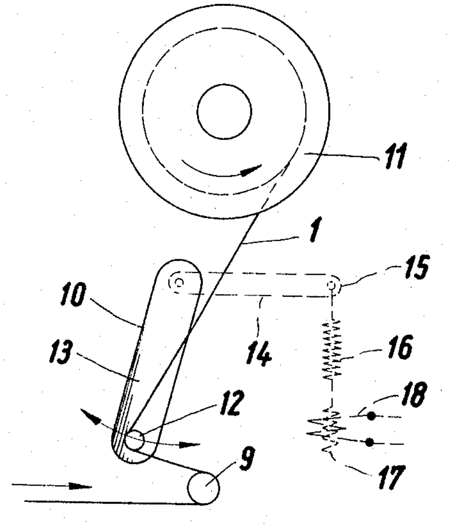
FIG. 2 shows the tensioning lever.

The tension lever 10 illustrated in FIGS. 1 and 2 consists of a pressure pin 12 disposed parallel to the tape surface, which pin is fixed vertically on one end of a rotatable lever 13. To the other end of the lever a further lever 14, indicated by a broken line, is drivingly connected, whose free end 15 is connected by way of a tension spring 16 with the armature 17 of an electro-magnet 18. FIG. 2 shows the operating condition with electro-magnet 18 excited. The tension lever is in its operating position, in which it immediately tautens the magnetic tape, especially in starting, so that risk of tape spillage is avoided. This position is always present when the image recorder is at "Recording," "Playback," or "Rewinding." On operation of the control which brings about the "Stop" position the electromagnet 18 is automatically cut off circuit and the tension lever guided to its position of rest, in which it is in merely loose contact with or retracted from the tape. The tape tension thus completely suspended thereby allows the tape to retract from the cylinder and/or from the magnetic heads rotating therein.

Figure 3:
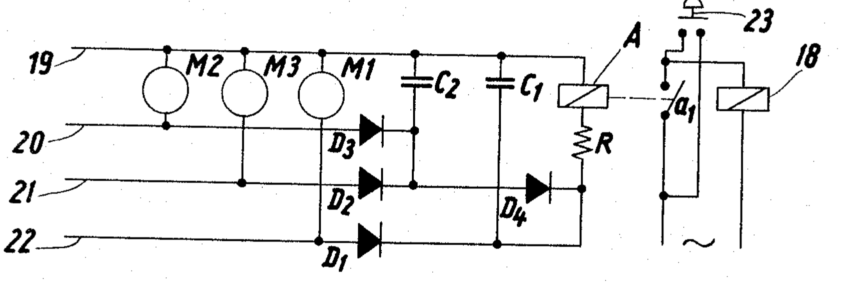
FIG. 3 shows a wiring diagram for the control of the electromagnets operating the diverting tensioning lever.

Such retraction, however, only occurs when the tape is already stopped before the retracting motion of the tension lever is initiated, i.e. when the spools and/or their driving motors are at a complete standstill; for otherwise the loosening of the tape would at once be cancelled out by the tensioning effect of the spool as it gradually came to a stop. To ensure that the tape stops before the tension lever is brought to its position of rest, a delayed timing is introduced between the operating of the "Stop" control and the retraction of the tension lever from the tape. The period of delay must depend on the preceding type of operation, e.g. on rapid motion for rewinding, or normal motion for recording or playback. A type of circuit fulfilling these conditions is shown in FIG. 3. The tape tensioning motor M2 is connected to supply leads 19–20, tape tensioning motor M3 to supply leads 19–21, and the tape driving motor M1 to supply leads 19–22. Each of these leads contains controls, not shown in the drawing, with switch contacts with which the motors are cut in or out, or, to reduce their torque—in particular that of the tape tensioning motors—can be connected to a lower supply voltage. To the wires 20 and 22 of the supply leads diodes D1 and D3 respectively and to wire 21 two diodes in series, D2 and D4, are connected, which rectify the alternating supply potential at the motor terminals. The pole of diode D1 not connected to wire 22 is connected via a capacitor C1 to wire 19. Parallel to capacitor C1 lies an auxiliary relay A in series with a resistance R. A make contact $a_1$ of the auxiliary relay lies in a control circuit with an electro-magnet 18 for the operation of the tension lever. Connected to the poles of diodes D3 and D2 not connected to wires 20 and/or 21 is a capacitor C2 connected with wire 19. Further the pole of diode D4 remote from diode D2 is connected to a junction wire between diode D1 and resistance R.

The circuit described acts as follows:

In recording and playback, the tape driving motor M1 receives full supply voltage, while the tape tensioning motors M2 and M3, which merely produce tape tension and/or take-up winding in the tape, are supplied with reduced voltage. The tape in this case runs at its normal speed. Capacitor C1 is charged, relay A excited and contact $a_1$ has closed the circuit with the electro-magnet 18, so that the tension lever 10 takes up its operating position, tensioning the tape. Capacitor C2 is only partly charged because of the reduced supply voltage on leads 19–20 and 19–21. If starting from this state the control for the stop position of the television recorder is operated, relay A, corresponding to time constant $R \cdot C1$, undergoes delayed cut-out. The time constant is selected so that the drive shafts of tape tensioning motors M2 and M3 are certain to come to rest before relay A is cut out.

In fast rewinding, one of the two motors M2 and M3, according to the direction of tape run, receives full supply voltage and thus brings the tape to high speed. Because of the consequent longer run-out time of the spools the delayed timing and/or the time constant on switching off the motors must be greater.

This condition is fulfilled by the fact that during fast rewinding capacitor C2 charges via diode D2 up to full potential, when motor M3 receives full potential, or via diode D3 when motor M2 receives full potential. Capacitor C1 is also charged to full potential via diode D4 from capacitor C2. On switching off motors M2 and M3 the time constant is because of the paralleling of condensers C1 and C2 composed of $R(C1+C2)$ and consequently causes a greater timing delay. In order also that an individual stationary television image can be observed while the tape is not tautened, an additional push button 23 is provided with which relay contact $a_1$ can be bridged when required. This excites relay 18 and tautens the tape, so that as long as push button 23 is operated the tape abuts closely on the magnetic heads rotating in the cylinder.

What I claim is:

1. Apparatus for magnetic tape recording/reproducing of television signals comprising a cylinder, means for driving and guiding said tape to, around and away from said cylinder, a rotatable disc coaxially mounted within said cylinder, a transducer unit connected with the periphery of said disc, and a tensioning lever for guiding said tape away from said cylinder and for automatically tautening and releasing said tape; said tensioning lever being coordinated with a time-delay member releasing said tension of said tape only when tape and driving means are at a complete standstill.

2. Apparatus for magnetic tape recording/reproducing as claimed in claim 1, wherein said time-delay member is connected with an electromagnet which moves said tensioning lever via a spring member.

3. Apparatus for magnetic tape recording/reproducing as claimed in claim 1, wherein said time-delay member consists of one or several resistance-capacitance members.

4. Apparatus for magnetic tape recording/reproducing as claimed in claim 1, wherein said driving means for said tape consist of two tape winding motors which in fast rewinding are on full alternating potential and in normal running on a lower potential and of an A.C. tape drive motor; a first of the feed leads from each of the motors is connected to a common wire, said wire is further connected with one pole of two capacitors, a second of said feed leads from each of the tension motors lies via a diode on the other pole of a first one of said capacitors; the second feed lead from said tape drive motor is connected via a further diode to the other pole of the second one of said capacitors and a diode, a resistance, and a relay together connected in parallel to said first capacitor, said relay having an operating contact which lies in a circuit for an electromagnet for moving said tensioning lever.

References Cited by the Examiner

UNITED STATES PATENTS

| | | | |
|---|---|---|---|
| 2,919,314 | 12/1959 | Holt | 179—100.2 |
| 2,975,242 | 3/1961 | Fisher et al. | 179—100.2 |
| 2,998,495 | 8/1961 | Maxey | 179—100.2 |
| 3,231,668 | 1/1966 | Nishiwaki et al. | 179—100.2 |

BERNARD KONICK, *Primary Examiner.*

L. G. KURLAND, *Assistant Examiner.*